United States Patent Office 3,353,701
Patented Nov. 21, 1967

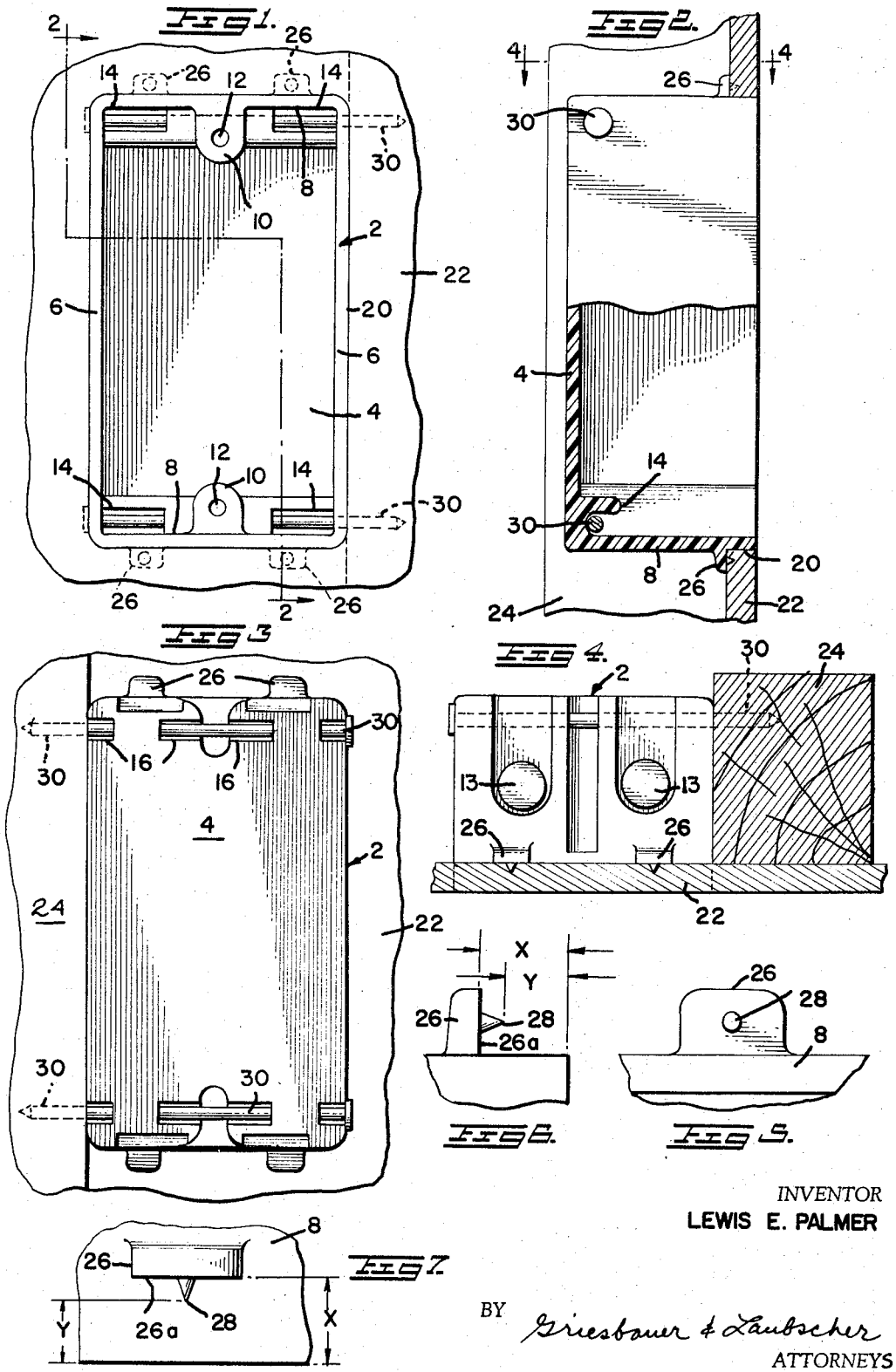

3,353,701
MOLDED-INSULATION ELECTRICAL BOX
HAVING INTEGRAL SPACER LUGS
Lewis E. Palmer, Washington, W. Va., assignor to Union Insulating Company, Parkersburg, W. Va., a corporation of West Virginia
Filed July 28, 1965, Ser. No. 475,452
2 Claims. (Cl. 220—3.5)

ABSTRACT OF THE DISCLOSURE

A molded electrical wiring box including at its upper and lower ends integral external lug means for abutting the rear face of a panel containing an opening in which the box is mounted. The lug means accurately position and stabilize the box prior to the nailing of the box to a stud support.

This invention relates generally to an improved molded-insulation electrical wiring box, and more particularly to an improved nail-fastened molded wiring box specifically designed for house trailer use and including at each end integral spacer lug means for accurately positioning and stabilizing the box when inserted forwardly through an opening in an interior plywood panel prior to nailing of the box to a stud support.

In the prior U.S. Patent No. 3,176,869 which issued to D. W. Kinney on Apr. 6, 1965, and was assigned to the same assignee as the present invention, a unitary nail-fastened insulated outlet box is disclosed that is formed by molding from a conventional non-metallic insulating material. This prior wiring box is formed by simple molding apparatus consisting solely of two die parts having relative linear movement, whereby laterally movable molding parts are not required. An object of the prior invention was to provide in the molded box at the juncture between the bottom and end walls thereof a plurality of longitudinally aligned grooves some of which open into the interior of the box and the others open to the exterior of the box, thereby defining a nail-receiving passageway including a plurality of solid wall portions which support and guide the nail and prevent it from being bent when it is hammered into a support.

An important market for such non-metallic molded insulation wiring boxes is the house trailer construction field, wherein the electrical insulating properties and low unit cost of molded insulation boxes are important advantages recommending their use over conventional sheet metal wiring boxes. However, certain installation problems must be considered as a consequence of the "inside-out" manner in which conventional house trailers are normally manufactured. More specifically, owing to limitations of size and simplicity of manufacture, it is conventional in the house trailer field to first secure to the wall studs the interior plywood panels and then to electrically wire the trailer from without. In order to properly mount a nail-fastened molded-insulation wiring box in an opening contained in a plywood panel so that the free edges of the open-topped box are flush with the interior face of the panel, a workman outside the trailer requires some means for properly positioning and stabilizing the box in the opening prior to nailing the box to the wooden stud. In the prior patented art, various means have been proposed in the metallic wiring box art for securing a box in a wall opening. Examples of such known securing means are presented in the U.S. patents to Kruse No. 989,854, Miller No. 1,536,906, Hodges No. 1,662,422 and Hubbell No. 1,999,194. While these known devices have general utility, they do not afford the aforementioned advantages of the molded insulation wiring box of the present invention as specifically designed for house trailer construction use.

Accordingly, a primary object of the present invention is to provide a unitary open-front electrical wiring box molded of insulation material and including, in combination, integral lug means extending normal to, and equally spaced from the free edges of, the top and bottom walls of the box, and nail-receiving passageways molded in the box at the junctures between the rear wall and said top and bottom walls. These lug and passageway means are integrally formed on and in the molded box, respectively, by simple molding apparatus including two die parts having relative linear movement, whereby no laterally moving molding parts are required. As a consequence of the invention, when the molded wiring box is to be mounted in an opening contained in a plywood panel forming an interior wall surface of a trailer, the box is inserted from without, forwardly through the opening until the integral lug means on the box engage the rear surface of the panel, whereupon the box is nailed to the stud to which the panel is secured. In accordance with an important feature of the invention, each of the lug means is spaced from the free edge of the corresponding top or bottom wall of the box a distance equal to the thickness of the plywood panel, whereby the free edges of the side and end walls of the box are substantially coplanar with the decorative interior face of the panel.

In accordance with a more specific object of the invention, each of the lug means at the top and bottom of the box comprises a pair of laterally spaced lugs integral with and extending orthogonally from the end walls of the molded-insulation box. Each of the lugs has a planar end face adjacent the edge of the corresponding end wall, said end face being parallel with the plane containing the free edges of the box. This face is normally spaced from the edge a distance equal to the thickness of the panel. In accordance with a more detailed object of the invention, each lug includes at least one pointed projection that is adapted to penetrate the rear surface of the panel when the box is mounted in the opening, thereby further assisting in stabilizing and positioning the box relative to the panel prior to nailing of the box to the stud. In instances where the thickness of the panel does not quite equal the lug spacing distance (from the free edge of the corresponding end wall), the pointed extremities may be caused to merely abut (and not penetrate) the rear surface of the panel prior to nailing of the box to the stud.

Other objects and advantages of the invention will become apparent from a study of the following specification when considered in conjunction with the accompanying drawing, in which:

FIGURE 1 is a detailed front elevational view of an interior portion of a trailer wall in which the insulated electrical wiring box of the present invention is mounted;

FIGURE 2 is a sectional view taken along line 2—2 of FIGURE 1;

FIGURE 3 is a rear view of structure of FIGURE 1;

FIGURE 4 is a sectional view taken along line 4—4 of FIGURE 2; and

FIGURES 5–7 are detailed front, side and top views, respectively, of an integral spacer lug formed on an end wall of the wiring box.

Referring now to the drawing, the open-front rectangular electrical wiring box is molded of a conventional insulating material (for example, a phenolic resin compound such as "Bakelite," or other resinous materials, such as urea, vinyl or epoxy resin products) and includes a rear wall 4, a pair of opposed side walls 6, and bottom and top walls 8. Extending forwardly from the rear wall on the inner face of the bottom and top walls 8 are a pair of centrally-arranged integral ears 10 having threaded bores 12 that receive screws for fastening the mounting strap of a switch, outlet receptacle or other electrical device to the box. As shown in FIGURE 4, conventional knock-out plugs 13 are partially formed in each top and bottom wall to afford passage means through which the insulated wires may be introduced into the box for connection with the electrical device supported thereby. As disclosed in the aforementioned Kinney Patent No. 3,176,869, the body 2 has molded therein inwardly and outwardly directed grooves 14 and 16, respectively, adjacent the junctures of the rear wall with the top and bottom walls, respectively, which grooves define nail-receiving passageways that extend parallel to the plane of the open face of the body from one side wall to the other. The apparatus thusfar described is similar to the wiring box disclosed in the aforementioned Kinney patent.

The wiring box of the present invention is adapted for mounting in a rectangular opening 20 contained in the plywood panel 22 that constitutes the inner wall surface of a trailer. As is conventional in trailer construction, the plywood panel 22 is secured to a wooden stud 24 that extends vertically adjacent an edge of the opening 20. In accordance with the invention, the wiring box includes at each end a pair of integral lugs 26 that are molded integrally with the end walls during manufacture of the box. Each of the lugs 26 has a planar end face 26a (FIGURES 6 and 7) that is spaced from the free edge of the corresponding top and bottom walls a distance $x$, which distance is generally equal to the thickness of the plywood panel 22.

Extending horizontally from the planar end face 26a of each lug 26 is an integral pointed projection 28 which terminates a distance $y$ (FIGURE 6) from the edge of the corresponding top and bottom walls 8.

To secure the box in an opening contained in a panel, the nails 30 are partially driven into the nail-receiving passageways and the open-front portion of the box is inserted from the rear surface of the panel forwardly through the opening 20 until the pointed extremities of the projections 28 engage the rear surface of the plywood panel 22. One side wall of the panel contiguously engages the stud 24 (as shown in FIGURE 4), and assuming that the thickness of the panel equals the lug spacing distance $x$ shown in FIGURES 6 and 7, the box is further urged forwardly to cause the projections 28 to penetrate the rear surface of the panel. The free edges of the side, top and bottom walls of the box are now substantially coplanar with the forward surface of the panel 22, whereupon the nails 30 are driven home to secure the box to the stud 24.

In the event that the box is to be used with a plywood panel having a thickness equal to the dimension $y$ in FIGURE 6, in mounting the box in the opening prior to nailing, the box is merely inserted forwardly through the opening until the extremities of the projections 26 engage (but do not penetrate) the rear surface of the plywood panel. Following this engagement (at which time the free edges of the box are coplanar with the forward surface of the panel), the nails are driven home to secure the box to the wooden stud.

Although the present invention has been described in connection with rectangular boxes adapted for mounting in corresponding wall openings, it is apparent that the inventive concept is applicable to boxes of other configurations (i.e., square, octagonal, circular, oval and the like) adapted for mounting in corresponding wall openings.

While in accordance with the provisions of the patent statutes, the preferred form and embodiment of the invention has been illustrated and described, it will be apparent to those skilled in the art that various changes may be made in the apparatus described without deviating from the invention set forth in the following claims.

What is claimed is:

1. A molded plastic wiring box adapted for mounting in an opening contained in a relatively thin sheet secured to a vertical support, comprising an open-front body molded of insulating material and including a vertical rear wall, opposed horizontal bottom and top walls, opposed vertical side walls, and a plurality of unitary lugs extending integrally from and normal to the external surface of each of said top and bottom walls, respectively, each of said lugs having a planar front surface adjacent, parallel with and spaced from the corresponding free front edges of said top and bottom walls a given distance substantially equal to the thickness of the sheet, one of said side walls being adapted to contiguously engage said support when the open front end of the body is mounted in said opening;

a pointed projection extending from the planar front surface of each of said lugs in the direction of, and spaced from the free front edge of, the corresponding one of said top and bottom walls;

and means for securing said body to the support when said body is inserted into the opening from the rear side of the sheet, whereby the body is accurately positioned and stabilized in the opening by the cooperation between said integral lug means and the rear face of the sheet prior to the securement of the box to the support.

2. A molded plastic wiring box adapted for mounting in an opening contained in a relatively thin sheet secured to a vertical support, comprising an open-front body molded of insulating material and including a vertical rear wall, opposed horizontal bottom and top walls, opposed vertical side walls, and a plurality of laterally spaced unitary lugs extending integrally from and normal to the external surface of each of said top and bottom walls, respectively, each of said lugs having a planar front surface adjacent, parallel with and spaced from the corresponding free front edges of said top and bottom walls a given distance substantially equal to the thickness of the sheet, one of said side walls being adapted to contiguously engage said support when the open front end of the body is mounted in said opening;

and mounting ear means centrally arranged on, and wholly contained between, the adjacent inner surfaces of said top and bottom walls and extending forwardly from said rear wall, each of said mounting ears containing a threaded bore by means of which an electrical device may be screw-mounted within the box;

said body having molded therein horizontal nail-receiving passageways at the junctures of said rear wall with said top and bottom walls, respectively, and passageways extending from one side wall to the other, whereby said box is accurately positioned and stabilized in said opening by the cooperation between said integral lugs and the rear surface of said panel prior to the driving of nails through said passageways into the support.

References Cited

UNITED STATES PATENTS

| | | | |
|---|---|---|---|
| 856,640 | 6/1907 | Huntting | 220—3.6 |
| 982,193 | 1/1911 | Thayer | 220—3.4 |
| 1,893,357 | 1/1933 | Carlson | 220—3.6 |
| 2,126,259 | 8/1938 | Howells et al. | 220—3.6 |
| 2,688,417 | 9/1954 | Bowers | 220—3.9 |
| 3,176,869 | 4/1965 | Kinney | 220—3.9 |
| 3,251,130 | 5/1966 | Miles | 220—3.4 |

THERON E. CONDON, *Primary Examiner.*

JAMES R. GARRETT, *Examiner.*